United States Patent [19] Beecroft et al.

[11] 3,903,545

[45] Sept. 2, 1975

[54] TRACK DENSITY INCREASING APPARATUS

[75] Inventors: Harold James Beecroft, Minneapolis; Thomas Francis Burniece, III, Edina; Douglas Joseph Hennenfent, Minneapolis, all of Minn.

[73] Assignee: Control Data Corporation, Minneapolis, Minn.

[22] Filed: Apr. 5, 1974

[21] Appl. No.: 458,262

[52] U.S. Cl. .................................... 360/97; 360/125

[51] Int. Cl.$^2$ ........................................... G11B 5/12

[58] Field of Search ............. 360/97, 21, 77, 47, 86, 360/98, 122, 125

[56] References Cited

UNITED STATES PATENTS

| | | | |
|---|---|---|---|
| 2,712,572 | 7/1955 | Roberts | 360/21 |
| 3,263,031 | 7/1966 | Welsh | 360/77 |
| 3,362,021 | 1/1968 | Ma | 360/77 |
| 3,593,331 | 1/1971 | Connell | 360/77 |
| 3,614,756 | 10/1971 | McIntosh | 360/77 |
| 3,665,118 | 5/1972 | Cooper, Jr. | 360/21 |
| 3,812,533 | 5/1974 | Kimura | 360/77 |

*Primary Examiner*—Daryl W. Cook
*Assistant Examiner*—Jay P. Lucas
*Attorney, Agent, or Firm*—Edward L. Schwarz

[57] ABSTRACT

Apparatus for increasing the density of data tracks on the recording surfaces of a disc memory of the type having at least one pre-recorded servo track which is continuously read by a servo head whose output signal changes with its position relative the track and is constantly adjusted to maintain a predetermined servo head output signal condition, without increasing the number of servo tracks in the memory. The improvement comprises a servo head having a plurality of flux paths, each passing through a signal winding, and having adjacent read gaps arranged and spaced such that by successively employing one or another of the read gaps to sense a servo track, the number of data tracks can be increased by an integer multiple. Signal winding selection apparatus is added which receives the track address from the external user, and which, dependent thereon, selects one of the signal windings and supplies its servo signal to the controller which shifts the servo arm and maintains the selected servo gap in the desired position adjacent the desired servo track.

7 Claims, 5 Drawing Figures

TRACK DENSITY INCREASING APPARATUS

BACKGROUND OF THE INVENTION

1. Field of the Invention

Magnetic disc memories are widely employed as peripheral data storage devices in computer and real time data storage systems. In the usual situation, a plurality of discs are mounted on a single spindle and a plurality of magnetic transducing heads are suspended from arms adjacent the flat surfaces of the discs in a position allowing data to be transcribed on, i.e. written on and read from the discs. The arms are mounted on a movable carriage whose position is controlled by a voice coil actuator. By changing the drive current in the voice coil, the heads may be positioned at any desired distance from the spindle axis, allowing access to any one of the large number of data tracks on each disc. In certain disc memories now available, these tracks are concentrically located at radial increments of approximately 0.005 inch per track, resulting in a radial density of around 200 tracks per inch.

At such high track densities, it is of course necessary to accurately position each data head with respect to the selected track. One method adopted for positioning of these heads involves dedicating an entire disc surface to carrying pre-recorded servo tracks, the disc carrying these tracks being referred to as a servo disc. These tracks normally have the same density desired for the data tracks, and the head dedicated to reading information on the servo track is used to determine its own location with respect to the spindle axis and the servo tracks. In the preferred situation, adjacent servo tracks have distinct patterns such that when the read gap of the servo head is positioned midway between them, the signal from the servo head winding will have an equal component in its wave form from each track, and the head may be accurately positioned by balancing or nulling these components. The data heads which transcribe data on the remaining disc surfaces are mechanically linked to the servo head and move in step with it, so that positioning the servo head adjacent a particular servo track will automatically position the data heads at the identical radius from the spindle axis, or at such other radius as is desirable. The voice coil actuator art now permits positioning of the servo head with an accuracy of a few tens of micro-inches, and similar accuracy in the positioning of the data heads.

2. Description of the Prior Art

In attempting to increase the amount of data stored by a particular disc memory configuration it is necessary to increase either the linear density of the recorded bits, i.e. increase the bits per track, or to increase the radial density of tracks. The number of tracks per radial inch is usually increased by increasing the number of servo tracks per radial inch. This however, has certain drawbacks in that either a new servo disc must be fitted to units in the field or new servo tracks written on the servo disc. With the high positional accuracy of which voice coil actuators are now capable, it has been discovered that data track density can be at least doubled without seriously affecting transcription accuracy. In so doing, it is possible to use a single servo track (viz. the balance or null location between adjacent servo tracks) to provide a reference position for two or more data tracks, with mechanical or electrical offset providing the intermediate data head positions for the data track or tracks added between those formerly present.

One aspect of this invention involves a modified servo head having a plurality of adjacent read gaps. U.S. Pat. No. 3,514,851 (Perkins, et al.) discloses a magnetic head structure having a plurality of flux paths and read gaps similar to the servo head forming part of this invention. However, the geometric relationship of the read gaps to each other is significantly different, and that disclosed in Perkins is not felt to be desirable for the application. U.S. Pat. No. 3,656,130 (Bucklin, et al.) discloses apparatus which accomplishes one result of this invention, to provide a plurality of data tracks references to a single servo track. However, Bucklin, et al. accomplishes this by providing a plurality of data heads for a single servo head. This method does not permit easy conversion of data recording systems already in existence.

BRIEF DESCRIPTION OF THE INVENTION

The servo head core used in the improved apparatus has two or more separate flux paths, each path having its own flux gap for accomplishing reading of the servo tracks. The flux paths are arranged such that the gap in each intersects a transducing face on the exterior of the core. The transducing face is located on the core in such a position allowing it to be placed adjacent the servo disc and thereby allow the gaps to sense the magnetic patterns of the servo tracks. The gaps must be positioned with respect to each other to make perpendicular bisectors of adjacent flux gaps at the transducing surface approximately parallel and spaced apart by a predetermined amount. To state this geometric relationship another way, the lines of intersection of adjacent flux gaps with the transducing surface must form two parallel sides of a non-rectangular parallelogram.

This head core, when built to certain dimensions and with signal windings added, can be employed in the previously-described disc memory system having a servo head mechanically linked to position the data heads, as a replacement for the old servo head. In the old system, the servo head had a single flux path and a single winding whose output was employed by the head arm controller to accurately position the heads at a desired radius from the spindle axis. In this modified system, a signal winding selector must be interposed between the head positioner apparatus and the signal windings, to select the signal from one of the windings for use by the positioner. The winding is selected on the basis of the address signal supplied to the disc memory system by the computer for which it forms a peripheral memory. Since additional tracks are available in the memory, the track address must be lengthened to provide a designator specifying which servo head flux gap is to be used in positioning the servo head adjacent the servo track specified by the remainder of the track address. This gap designator is sent to the winding selector and conditions the selector to gate one of the signal winding outputs to the head positioner. Thus, by employing different signal windings, the same servo track may be used to position the servo head assembly and the data heads in two or more positions, depending on the number of servo head flux paths and read gaps. (It should be clearly understood, that when the term "servo track" is used, it is intended to include the balance or null point between two adjacent servo tracks.)

To most efficiently use this additional positioning capability when balance point servoing is used, it is convenient to position the read gaps in the servo head such that adjacent perpendicular bisectors of the effective width of the servo read gasp are spaced apart by an amount equal to the distance between adjacent servo tracks divided by number of servo read gaps. (By "effective width" of a read gap is meant the total width of the annular band on the servo disc whose magnetic pattern at any radius will cause an appreciable amount of flux to flow in the flux path of the core containing the gap, under normal or design operating conditions. In general, the effective gap width is greater than the physical gap width because of fringing effects. And hereafter, the term "bisector" will mean the perpendicular bisector of the effective gap width of a servo head core gap.) For each additional flux path included in the replacement servo head assembly, an additional set of data tracks will be accessible. The effective width of the read and write gaps in the data heads must be decreased to no more than the spacing between adjacent bisectors so as to prevent destruction of a previously written track when the one immediately adjacent it is recorded and to allow its later reading.

Accordingly, one object of this invention is to increase the data storage capacity of conventional disc memories.

A second object is to accomplish the previous object with a minimum of modifications to existing disc memory systems.

Another object is to increase disc memory storage with a minimum of expense.

Still another object is to increase the disc memory storage capacity without any modification of the data discs themselves.

Another object is to increase the storage capacity of disc memory systems without the necessity of retranscribing or rewriting servo tracks or data already recorded on discs used therein.

DESCRIPTION OF THE PREFERRED EMBODIMENTS

Figure 1A:
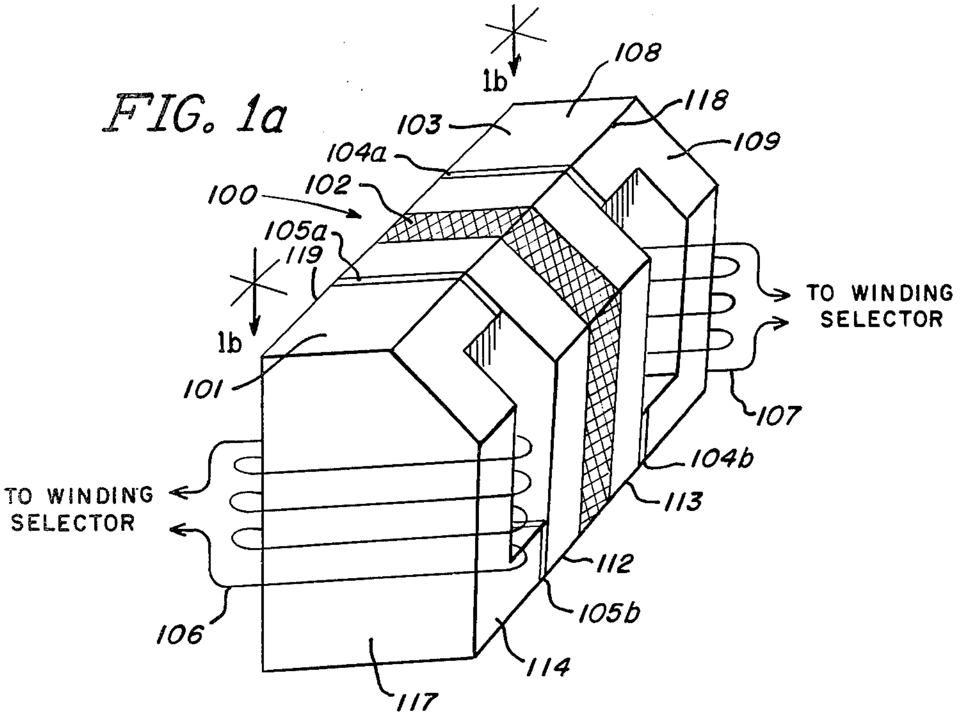
FIG. 1*a* is a perspective view of a magnetic head having a plurality of separate flux paths.

It is convenient to first discuss the servo head which this modified system employs. In FIG. 1*a*, a servo head is shown comprising windings 106 and 107 and head core 100. Head core 100 comprises a first C-shaped element 101 formed from any convenient magnetic material such as ferrite from which magnetic heads are commonly constructed. Flux gaps 105*a* and 105*b* can conveniently comprise some nonmagnetic material such as epoxy which serves the additional purpose of bonding element 101 to I-shaped element 112. C-shaped element 101 and I-shaped element 112 along with flux gaps 105*a* and 105*b* comprise a complete magnetic flux path. A second flux path is similarly formed by a second C-shaped element 103 and a second I-shaped element 113. Similarly, the two elements have flux gaps 104*a* and 104*b* between them. As can be seen from FIG. 1*a*, the flux paths comprise roughly rectangular and magnetically separate prismatic structures having adjacent openings intersecting side 114 and the side opposite, now shown in FIG. 1*a*, but shown on edge as side 120 in FIG. 1*b*. These two prisms are bonded together by a suitable material 102, which provides the magnetic separation between the two flux paths. When ferrite is employed as the material from which the paths are fabricated, known glass bonding techniques may be used. If metallic materials are used in the construction of the prisms, solder may be used. Epoxy glue can be used with either material. It is extremely important that faces 101 and 103 be exactly coplanar if both are flat, and in the same curved surface if both are curved, for these two faces together form transducing face 108. It is usually convenient to machine faces 101 and 103 after assembly to assure their forming together a single continuous surface suitable for transcribing data.

Figures 1B, 2:
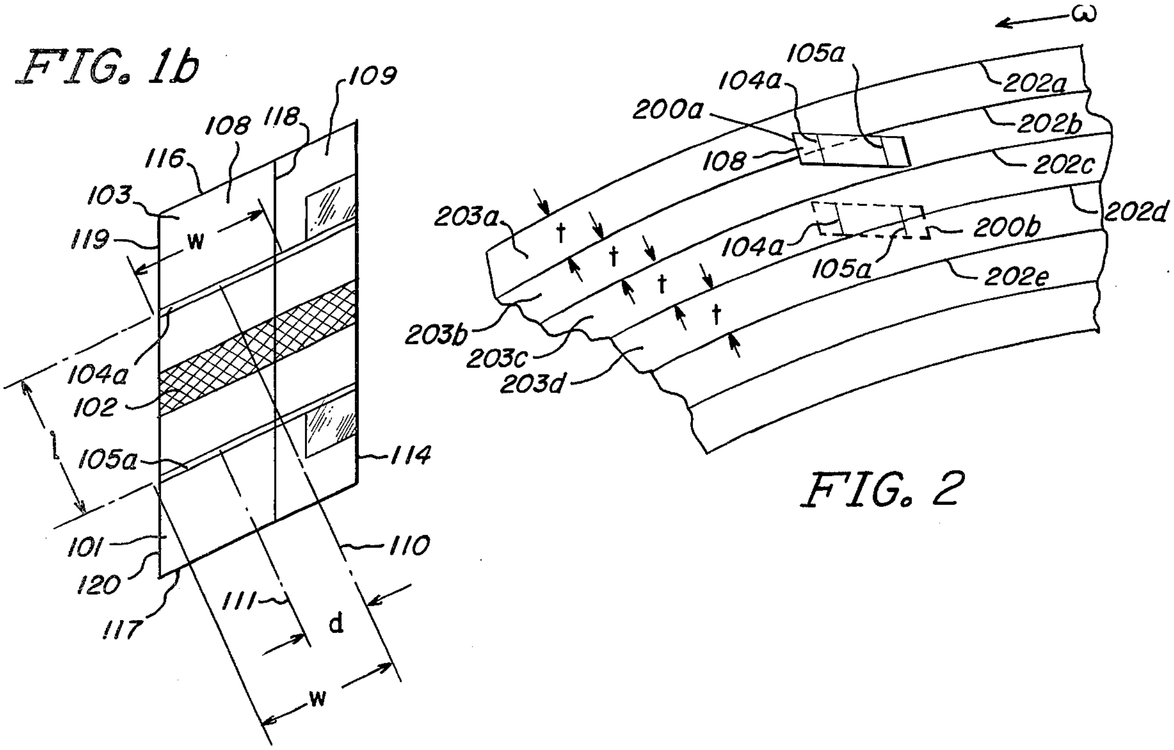
FIG. 1*b* is a projective view of the transducing face of the head core shown in FIG. 1*a*.
FIG. 2 is a sketch view of the transducing face in two alternative positions respective a recording surface having servo tracks recorded within itself.

The shape of transducing face 108 and the relative position of flux gaps 104*a* and 105*a* can be best understood by reference to FIG. 1*b*. Face 108 has parallel edges 118 and 119 extending along its long dimension, with parallel flux gaps 104*a* and 105*a* intersecting them. This makes gaps 104*a* and 105*a* of equal width. The two important geometric relationships between gaps 104*a* and 105*a* is that they be parallel and have equal widths. Non-magnetic spacer 102 is interposed between the two flux gaps. Since flux gaps 104*a* and 105*a* are parallel to each other, their perpendicular bisectors 110 and 111 respectively are also parallel to each other. When two servo read gaps are employed to double the number of data tracks (and storage capacity), it is preferred the distance $d$ between perpendicular bisectors 110 and 111 be one-half the spacing $t$ of adjacent servo tracks on the disc with which head 100 will be used. If $0<d<t/2$ or $t/2<d<t$, the result will be unequal spacing between the data tracks. $d$ may also be greater than $t$, but this will cause uneven spacing between the innermost tracks and between the outermost tracks. However, because of the small dimensions with which head 100 is made, it may be desirable to set $d=3t/2$ or $d=5t/2$ to separate the gaps a greater amount. It is only necessary that $d$ is not an integral multiple of $t$, and in most systems will be chosen to be an odd multiple of $t/2$ to provide maximum data track width. It is well known prior art that gap width $w$ is preferrably equal to the servo track spacing. Hence it is most desirable that $w=2d$.

Face 109 is angled both with respect to transducing face 108 and side face 114. The purpose is simply to provide a smaller actual width for gaps 104*a* and 105*a* without the necessity of decreasing the distance between face 114, and that opposite it, and correspondingly increasing fabrication difficulties.

In operation, a magnetic recording surface having a pattern of servo tracks magnetically recorded therein is made to pass adjacent and approximately parallel to transducing plane 108. In general, the clearance between recording plane 108 and the recording medium is extraordinarily small, usually much less than 0.0001 in. As the magnetic pattern passes by gaps 104a and 105a, magnetic flux flows through the two flux paths and induces an electrical signal in windings 106 and 107. This is entirely conventional, and no further note need be taken of it.

FIG. 2 shows the outline of a typical transducing face 108 in position 200a with gaps 104a and 105a in position adjacent the servo tracks of a servo disc. Arcs 202a, 202b, 202c, 202d, and 202e are shown as they might lie on such a servo disc between adjacent servo tracks, and are concentric with each other and with the servo disc itself. A servo track is assumed to lie between each pair of adjacent arcs, the magnetic patterns substantially filling the annular ring therebetween created. Gaps 104a and 105a are seen to have actual physical width slightly less than the difference in radii between each pair of adjacent arcs 202a–e, and have effective widths approximately equal to this difference. Gap 104a is shown straddling arc 202b, with half of its effective width in track 203a, and half in track 203b. Tracks 203a and 203b have distinct and different patterns recorded in them. For example, according to the prior art, track 203a may have a plurality of spaced-apart pulses and track 203b may have pulses of similar magnetic field strength physically located between the pulses in track 203a. As the servo disc rotates as shown by the rotational vector $\omega$ flux will flow through the flux paths of both gap 104a and 105a, inducing an electric current in signal windings 106 and 107 wound about each flux path. When head 100 is located so that either gap 104a straddles two tracks as in position 200a or gap 105a straddles two tracks as in position 200b, the signal produced by the winding sensing the flux across the gap so straddling the tracks will be a definite, identifiable null.

Each data track is specified by reference to a particular servo track null and one of the servo gaps 104a or 105a. If it is desired to reference a data track associated with gap 104a, then this gap is employed in positioning transducing face 108 as shown in position 200a and producing that null. If it is desired to reference a track associated with gap 105a, then the signal from the winding associated with gap 105a is used in positioning face 108, and causes face 108 to adopt position 200b, with gap 105a straddling arc 200d and forming the null signal at that point. In this position it can be seen that face 108 in position 200b is displaced a distance exactly 1½ times $t$ from position 200a. Gap 105a can of course be made to straddle arc 202c and occupy a position one-half of the track width from position 200a, but this position was not used for illustrative purposes because of confusion resulting from overlap of the two sketches of face 108.

Figure 3:
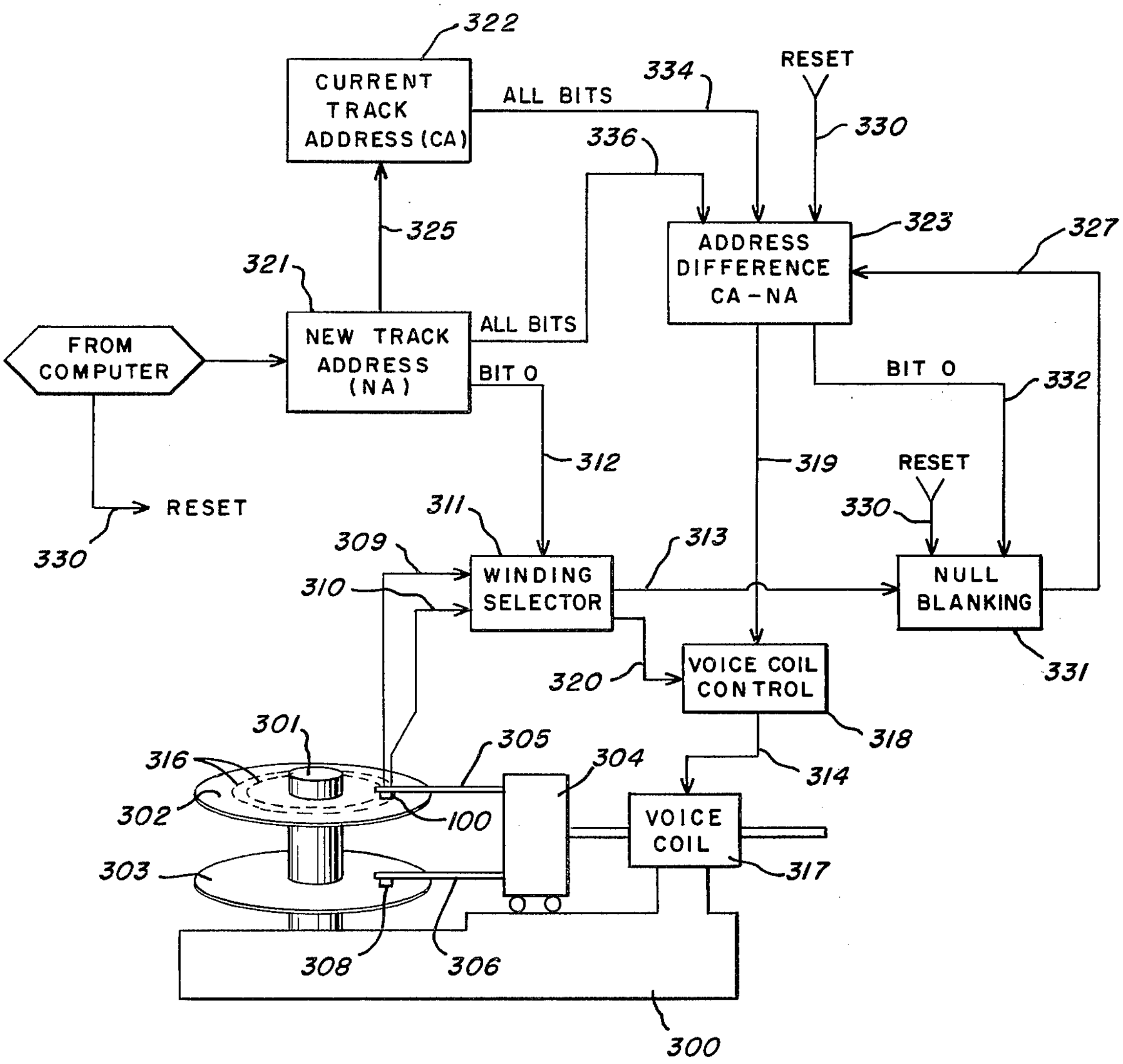
FIG. 3 is a block diagram of a disc recording system modified according to this invention to increase data storage.

Turning next to FIG. 3, therein is shown in block diagram form a typical disc memory system embodying this invention. Frame 300 and spindle 301, which is rotatably mounted on it, are conventional. Disc 302 is rigidly mounted on spindle 301, rotates therewith, and carries a plurality of servo tracks on its upper surface, of which tracks 316 are typical. The nulls between adjacent servo tracks will be designated by sequential positive integers starting with 0 for the outermost null. Data track 303 is also firmly affixed to and rotated by spindle 301. The upper surface of disc 303 is covered by a conventional magnetic recording layer in which data tracks may be recorded, and which have numerical designations identical to those of servo tracks 316.

It should be understood that the lower side of both discs 302 and 303 may similarly be employed for data transcription, and in most systems in fact are. Voice coil or carriage actuator 317 is rigidly attached to frame 300 and responsive to a drive signal supplied on line 314, can shift carriage 304 radially with respect to the axis of spindle 301 to any desired position within predetermined radii. Arms 305 and 306 are rigidly affixed to carriage 304 and move with it as it is shifted by voice coil 317. Servo head 100 is affixed to the free end of arm 305 in such a manner that transducing face 108 is suspended parallel to the upper surface of disc 302 and separated from it by a thin air film. Data head 308, adapted according to known principles for the transcription of data, is suspended from the free end of arm 306 to permit the transcription of data on the surface of disc 303. The effective width of the write gap of data head 308 is preferably approximately half the width between adjacent servo tracks 316 and in accord with well-known principles may also function as the read gap. Alternatively, a separate read gap may be employed.

The output of servo signal winding 106 is supplied to winding selector 311 via signal path 309, and the signal on winding 107 is similarly supplied on path 310. Depending on the signal on path 312, bit 0 of the new track address, winding selector 311 will pass the servo track signal on either path 309 or path 310 to line 313. Alternatively, winding selector 311 may be conveniently located on arm 305 itself so that only a single servo signal line need be led from the arm. In response to signals on paths 319 and 320, voice coil control 318 causes voice coil 317 to shift the position of carriage 304. Path 320 supplies the signal for fine positioning of carriage 304 once the desired null is reached. Path 319 is used to control shifting of the arms from one null to another, and therefore over-rides the fine positioning signal on path 320.

Whenever a new data track on disc 303 must be accessed, a new track address is sent to new track address register 321. The contents of new track address register 321 and current track address register 322 are sent on signal paths 334 and 336 respectively to address difference register 323. The difference between this new track and the current track address is computed by current track address register 322 and stored therein in absolute value and sign format. The absolute value of the address difference is decremented by two for each servo track pulse received by it on path 327 from pulse blanking circuit 331. The contents of address difference register 323, excepting bit O is continuously supplied to voice coil control 318 on path 319. Bit O of address difference register 323, which determines whether the difference is odd or even, is applied via path 332 to pulse blanking circuit 331 at the start of each track selection operation. At the start of each track selection operation, pulse blanking circuit 331 suppresses the first legitimate null applied to it on path 313 if bit O of the newly computed address difference is set, and suppresses all null transmission for a time dependent on the value of the same bit O. Reset line 330 merely provides for initialization of address difference register 323 and pulse blanking circuit 331 prior to each track selection operation.

For a new track selection operation, new track address register 321 receives a new track address from an external source such as a computer. If bit O of this new track address is set, this means that the set of data tracks accessable when servoing with the outer servo head gap is desired. If this bit O is 0, this means that the inner servo head gap must be employed to access the track desired. In either case, winding selector 311, in response to the condition of bit O as transmitted on path 312, gates the appropriate servo gap signals on either path 309 or path 310 to path 313. At the same time reset lines 330 are activated to prepare pulse blanking circuit 331 and address difference register 323 for changing tracks. Then a new address difference is computed in address difference register 323 by subtracting the new track address from the current track address. Current track address register 322 contents are then set to the contents of new track address 321 via path 325. The absolute value, excepting bit O, in address difference register 323 is continually monitored by voice coil control 318. As long as the absolute value which register 323 contains is different from 0 in any bit above bit O, voice coil control 318 causes carriage 304 to shift in the direction specified by the sign stored in register 323. If the sign bit is 0 (positive difference) the carriage is shifted outwardly. If equal to one, the carriage is shifted inwardly, closer to spindle 301.

As carriage 304 is shifted, signal path 313 supplies a signal to null blanking circuit 331 for each intervening null over which the selected gap passes. As explained earlier, if bit O supplied on signal path 332 is 0, winding selection did not change. In this case, nulls are blanked by null blanking circuit 331 for approximately the time it takes for head 100 to travel from a dead stop one-half the distance between adjacent servo tracks. Thereafter, each null on signal path 313 is supplied on signal path 327 to address difference register 323. In response to each null, address difference register 323 subtracts 2 from the absolute value of the address difference stored within it. When the bits of the address difference in register 323 above bit O are equal to zero, voice coil control 318 halts shifting of carriage 304, and fine carriage position signal 320 allows control 318 to make the minor adjustments caused by normal deviations from the ideal registration position, as is well known in the art.

When bit O of address difference register 323 is equal to one, a different situation exists. This means that a different winding on head 100 was selected, and different null blanking activity is required of null blanking circuit 331. At the instant of selection, the newly-selected gap in head 100 is positioned between two servo track nulls on disc 302. This means that the null blanking time must be reduced from the time for carriage 304 to travel one-half the distance between adjacent servo tracks to a value on the order of the time required for it to travel from a dead stop, one-quarter the distance between adjacent servo tracks. In addition, the newly-selected gap will pass over one more null than is necessary to properly decrement the contents of address register 323 to 0 when head 308 is finally positioned above the correct data track, and hence one null is completely suppressed.

This can be easily understood by considering a shift from, e.g. data track 0 to data track 3. (Recall that both servo track nulls and the data tracks are sequentially and incrementally numbered from the outside null or track inwardly, starting with 0 for each outermost null or track.) The inner servo gap is used when referencing even-numbered data tracks. When shifting to the outer servo gap, it can be easily appreciated that the outer servo gap will sense two servo nulls when shifting to its proper position above servo null 1 to reference data track 3. The same is true when selecting servo gaps in the opposite direction and regardless of the sign of the absolute value of the address difference, which controls direction of carriage 304 movement. In all these cases, it is necessary that null blanking circuit 331 suppress the first null sensed by the newly selected winding. This adjustment will then in effect synchronize the contents of address difference register 323 with the actual position of carriage 304, and allow correct addressing of the desired data track.

Figure 4:
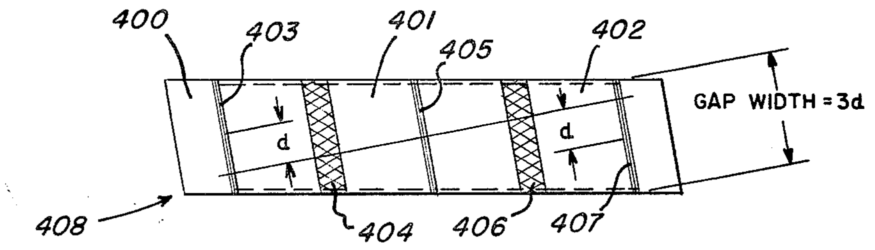
FIG. 4 is a projective view of the transducing face of a magnetic servo head constructed according to the teachings of this invention, and having three read gaps.

It is not necessary to employ only two gaps in the servo head of this invention. FIG. 4 discloses in plan view the transducing face of a similar head having three gaps 403, 405, and 407. They are contained in flux paths 400, 401, and 402, each having a winding not shown. These flux paths are bonded together by adhesive 404 and 406 in precisely the same fashion as explained for head 100 in FIG. 1*a*. Three gaps means that the addressing scheme described in conjunction with FIG. 3 must be modified to some extent, but this is a simple task for one skilled in the art. Using head 408 will allow each data track present in a system of the type having the same track spacing for both data and servo tracks to be replaced with three data tracks. With *d* as the distance between perpendicular bisectors of adjacent gaps, i.e. gaps 405, 407 or gaps 403 and 405, then *d* preferrably equals one-third the spacing between adjacent servo tracks, as is shown in FIG. 4. There is no theoretical limit to the number of gaps which may be included in such a replacement head. However, the positional accuracy of which the carriage actuator 304 is capable places a practical limit on this number. It is to be expected as the technology permits increased accuracy in positioning carriage 304 that four or five or even more gaps may be advantageously employed in such a head.

Having thus described our invention, what we claim is:

1. In data recording apparatus of the type having a rotatable spindle carrying a servo disc having at least one servo track thereon, a servo track read head, a movable support arm carrying the servo head flux gap adjacent the servo disc track-carrying surface and shifting the flux gap to the radial position specified by a head-positioning signal, a data recording disc carried by the spindle, a data head and a movable support arm shifting the data head in step with the servo head across the data disc recording surface to allow the data head to transcribe data on the data disc, and a head position controller receiving a track address signal and the servo head signal and supplying a head-positioning signal to the arm causing the radial shifting of the servo head to a position adjacent the servo track specified by the track address signal and causing a predetermined servo head signal to be maintained for a predetermined time thereafter, wherein the improvement allows an increase in the density of the data tracks on the data recording disc, and comprises:

a. a modified servo head comprising i. a core having at least two separate magnetic flux paths therein, a segment of each flux path forming a portion of an exterior transducing face and containing a flux gap intersecting the transducing face, the flux gaps being positioned with respect to each other to make perpendicular bisectors of adjacent flux gaps approximately parallel and spaced apart an amount different from an integral multiple of the distance between adjacent servo tracks, and ii. at least two signal windings, each winding wound about a single segment of one flux path and continuously producing a servo head signal; and b. a winding selector receiving the track address signal and each servo head signal and supplying one of the servo head signals to the head position controller dependent on the data track specified by the track address signal.

2. The apparatus of claim 1, wherein adjacent perpendicular bisectors of the servo head core flux gaps are spaced from each other an amount less than the distance between adjacent servo tracks.

3. The apparatus of claim 2, wherein adjacent perpendicular bisectors of the servo head core flux gaps are spaced from each other by an amount substantially equal to the distance between adjacent servo tracks divided by the number of distinct servo head flux paths.

4. The apparatus of claim 3, wherein the number of flux paths is 2.

5. The apparatus of claim 1, wherein the number of flux paths is 2.

6. The apparatus of claim 1, wherein the effective width of each servo head core flux gap is no greater than the width of a servo track.

7. The apparatus of claim 6, wherein the servo disc has a plurality of concentric servo tracks, and the effective width of each servo head core flux gap is approximately the difference in radius of adjacent servo tracks.

* * * * *